UNITED STATES PATENT OFFICE.

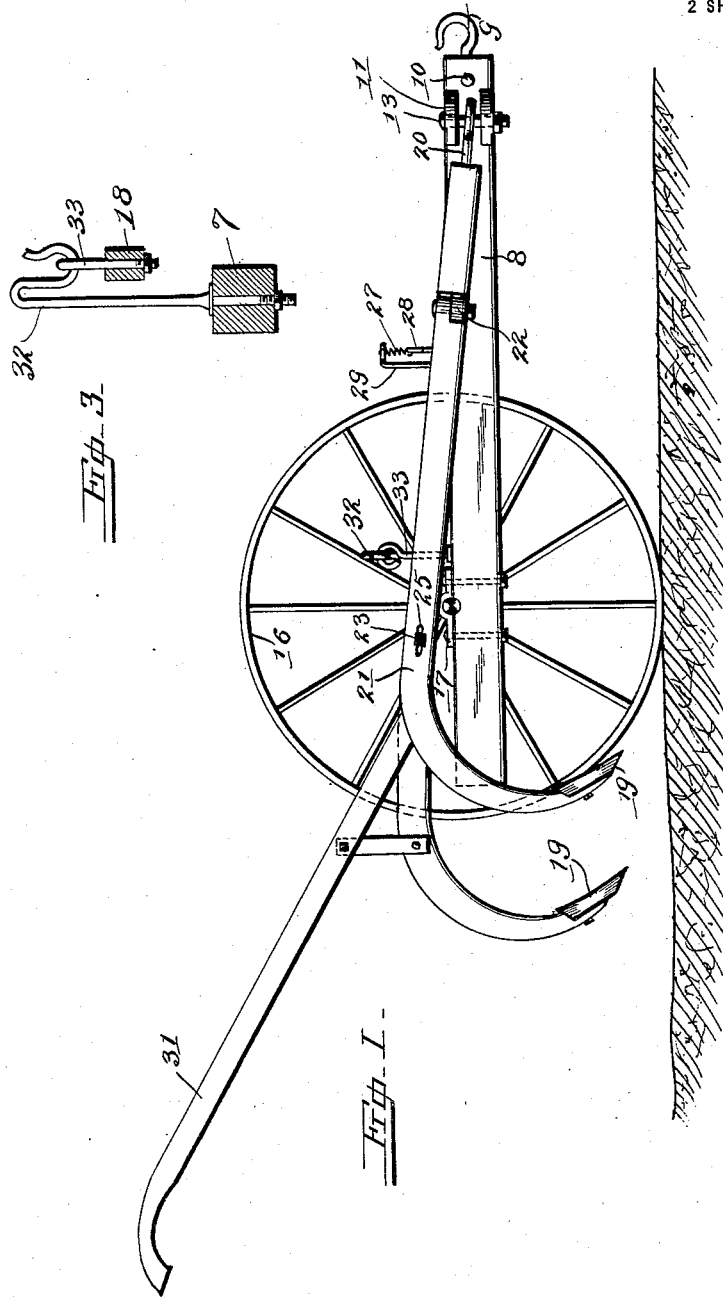

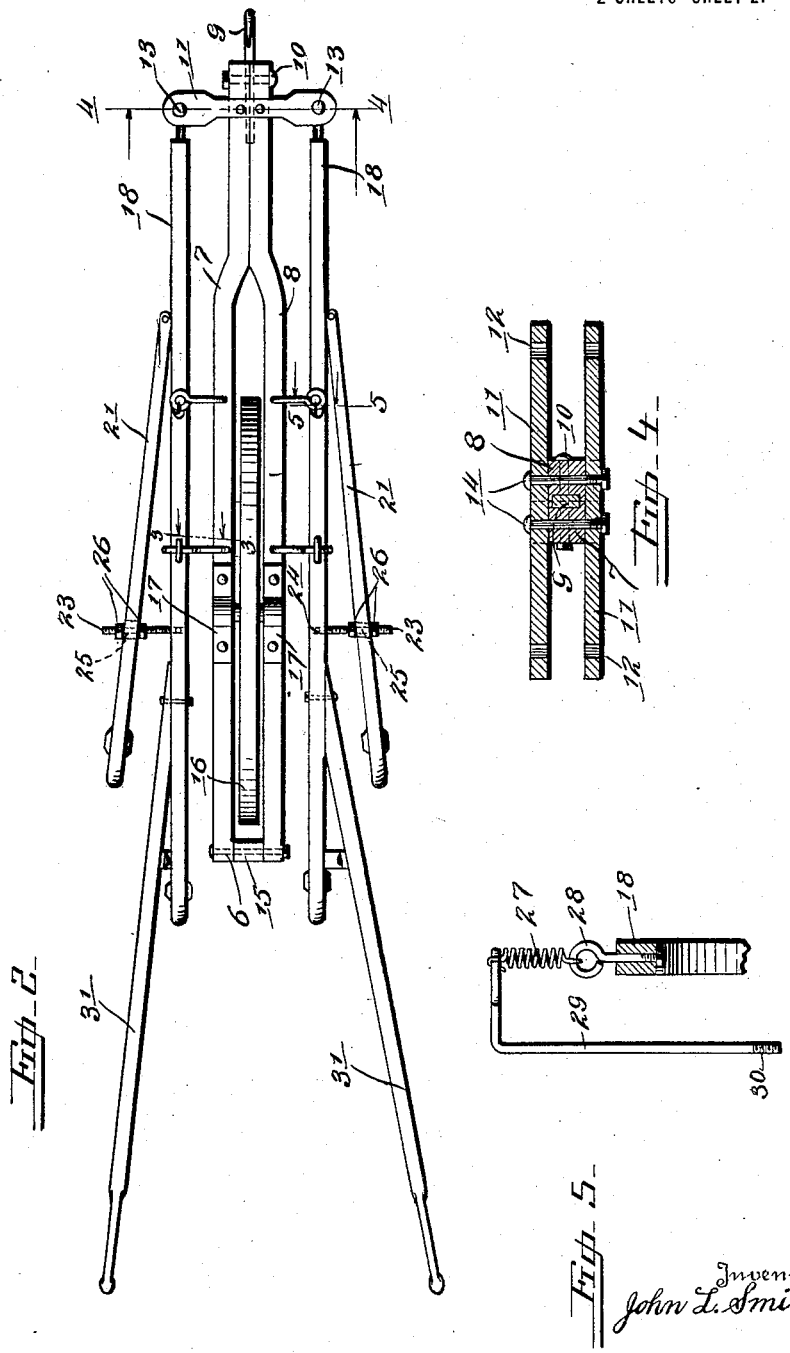

JOHN L. SMITH, OF NOLAND, ARKANSAS.

ONE-HORSE CULTIVATOR.

1,171,672.   Specification of Letters Patent.   Patented Feb. 15, 1916.

Application filed February 18, 1914. Serial No. 819,512.

*To all whom it may concern:*

Be it known that I, JOHN L. SMITH, a citizen of the United States, residing at Noland, in the county of Randolph and State of Arkansas, have invented certain new and useful Improvements in One-Horse Cultivators, of which the following is a specification.

This invention relates to cultivators especially one horse cultivators adapted for use between rows and having for its primary object to adjustably mount the marginal cultivator teeth permitting the same to be laterally adjusted in order that the range of cultivation may be increased or diminished, as desired.

Another object of the invention is to resiliently mount the shovel beams thereby regulating the depth of penetration of the teeth in the earth; the guide handles being in connection with the shovel beams in order to penetrate the teeth deeper in the earth when pressure is exerted thereon.

A further object of the invention is to movably associate the shovel beams with the wheel frame, the latter being provided with supports with which the shovel beams are engaged at the end of the rows so as to prevent the breaking of the corn stalks or the like while the cultivator is being turned, likewise facilitating the transporation of the device from one field to another or the like.

A still further object of the invention is the adjustable assemblage of the various parts of the invention so that each part may be replaced when it becomes inapt for use likewise permitting the various parts to be disengaged for shipment or the like thereby occupying a minimum amount of space.

Other objects as well as the nature, characteristic features and scope of my invention will be more readily understood from the following description taken in connection with the accompanying drawings and pointed out in the claims forming a part of this specification.

Referring to the drawings:—Figure 1 is a side elevation of a cultivator constructed in accordance with my invention showing the cultivator teeth as thrown out of engagement with the earth; Fig. 2 is a top plan view of the same; Fig. 3 is a cross sectional view taken on the line 3—3 of Fig. 2 showing the manner in which one of the shovel beams is supported on one side of the wheel frame when the cultivator teeth are to be disengaged from the earth; Fig. 4 is a cross sectional view taken on the line 4—4 of Fig. 2 and looking in the direction of the arrows, showing to advantage the manner in which the draft hook is associated with the wheel frame and the shovel beam connecting plates; and Fig. 5 is a sectional view taken on the line 5—5 of Fig. 2 and looking in the direction of the arrows showing the manner in which the shovel beam is resiliently carried by the wheel frame.

In the drawings wherein is illustrated the preferred embodiment of this invention a wheel frame 6 is provided which in the present instance comprises a pair of sections 7 and 8 the forward end of each of which is offset and have the inner longitudinal edges thereof snugly engaged, the free terminals thereof provided with elongated longitudinally extending slots which are engaged with the squared shank of the draft hook 9, said draft hook being held in engagement therewith through the medium of a nut and bolt 10. The offset forward ends of the sections 7 and 8 are provided with cut out portions on the upper and lower faces thereof in which are mounted plates 11 the opposite end of each of which is provided with an aperture 12 through which is mounted a bolt 13, said plates being secured in said sections 7 and 8 by bolts 14 as shown to advantage in Fig. 4, the plates lying flush with the upper and lower faces of the sections 7 and 8 by the provision of the cut out portion in the latter. The rear end of the sections 7 and 8 are likewise detachably connected and have mounted therebetween a spacing block 15. Revolubly mounted between the sections 7 and 8 is a traction wheel 16 which is of the ordinary configuration and has the axle thereof mounted on the upper face of the sections 7 and 8 and secured thereto by looped straps 17, said wheel being provided in order to facilitate the actuation of the cultivator likewise enabling the device to be more readily guided by the operator and permitting of the resiliently mounting of the shovel beams which will be presently described.

A pair of shovel beams 18 are provided each of which extends in parallelism with the sections 7 and 8 and has the rear end thereof arcuated in the usual manner and a shovel or tooth 19 detachably associated with the end thereof, the forward end of each of said beams having an eye bolt 20 extending therefrom which engages with one of the bolts 13 thereby permitting vertical movement of the shovel beams for a purpose which will subsequently appear. Each of the shovel beams has hingedly connected thereon an auxiliary shovel beam 21 which is identical in configuration to the shovel beams 18 with the exception that the auxiliary beams have the forward extremities thereof hingedly connected to ears 22 of the shovel beams 18 thereby permitting lateral movement of the auxiliary beams 21 in order to variate the range of cultivation according to the space of earth desired to be cultivated between the rows.

In order to retain the auxiliary beams 21 in a predetermined position a screw threaded shank 23 is pivotally mounted on each of the beams 17 having a vertical axis 24 so as to allow the bolt to move longitudinally with respect to the beams 18, each of said bolts extending through slots 25 in the auxiliary beams 21 and being held from movement thereon by jam nuts 26.

In order to yieldingly engage the teeth 19 of the shovel beams 18 and 21 with the earth a suitable resilient means is provided which in the present instance comprises a pair of coil springs 27 one end of each of which is in engagement with an eye bolt 28 the latter being detachably engaged with the shovel beams 18 while the opposite end of each of the springs is engaged with an eye bolt 29, said eye bolts 29 provided with screw threaded shanks 30 by which they are detachably associated with the sections 7 and 8 of the wheel frame 6. It is therefore seen that the teeth 19 will be permitted to normally very slightly penetrate the soil but may be deeply penetrated therein should it be so desired, by the pressure which is exerted on the guide handles 31, said handles being secured in the ordinary manner to the shovel beams 18, and serving the dual purpose of facilitating the guiding of the cultivator and at the same time regulating to a certain extent the depth of penetration of the cultivator teeth.

It is well known in this art that very often it is desired to disengage the cultivator teeth from the earth at the ends of rows when turning the cultivator in order to prevent the breaking of the corn stalks or the like between which the cultivator operates, since space at the ends of the rows is very often limited in permitting of the passing of the cultivator to a sufficient distance beyond the ends of the rows to insure the turning of the same without breaking down of the corn stalks or the like as previously pointed out. In order to eliminate this I have detachably arranged on the shovel beams 18 suitable hook members 32 which are engaged by eye bolts 33 of the wheel frame sections 7 and 8 when it is desired to retain the shovel beams out of engagement with the earth, the vertical movement of the shovel beams being permitted in view of the manner in which the eye bolts 20 at the forward ends thereof are mounted on the bolts 13.

In operation we will assume that the cultivator teeth 19 are in engagement with the earth in which instance only a slight penetration is provided for by the elastic elements 27. Should it be desired to penetrate the teeth deeper in the earth pressure is exerted on the handles 31 by the operator until the desired depth of penetration has been reached. When it is desired to disengage the teeth from the earth as at the ends of rows or the like as previously pointed out, pressure is exerted on the lower side of the handles 31 causing the teeth to be raised from engagement with the earth and permitting the eye bolts 33 to be engaged with the hooks 32 by the lateral movement of the beams 18 as is obvious. The lateral movement of the auxiliary beams 21 is of course permitted in view of the threaded shank 23.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A cultivator including a wheel frame, shovel frames associated with said wheel frame, auxiliary shovel frames mounted on the main shovel frames and being movable laterally to increase or diminish the range of cultivation, and means pivotally mounted on the main shovel frames and being adjustably associated with the auxiliary shovel frames to hold the latter in predetermined adjusted positions substantially as specified.

2. A cultivator including a wheel frame, main shovel frames associated with the wheel frame, auxiliary shovel frames pivotally mounted on the main shovel frames and being movable in a horizontal arc to increase or diminish the range of cultivation, threaded bolts pivotally mounted on said main plow frames and being detachably engaged with the auxiliary plow frames to hold the latter in predetermined adjusted positions.

In testimony whereof I affix my signature in presence of two witnesses.

JOHN L. SMITH.

Witnesses.
G. A. SAGE,
A. J. WITT.

Copies of this patent may be obtained for five cents each, by addressing the "Commissioner of Patents, Washington, D. C."